R. H. WATERS.
VEHICLE TIRE.
APPLICATION FILED JULY 22, 1921.
1,407,967.
Patented Feb. 28, 1922.
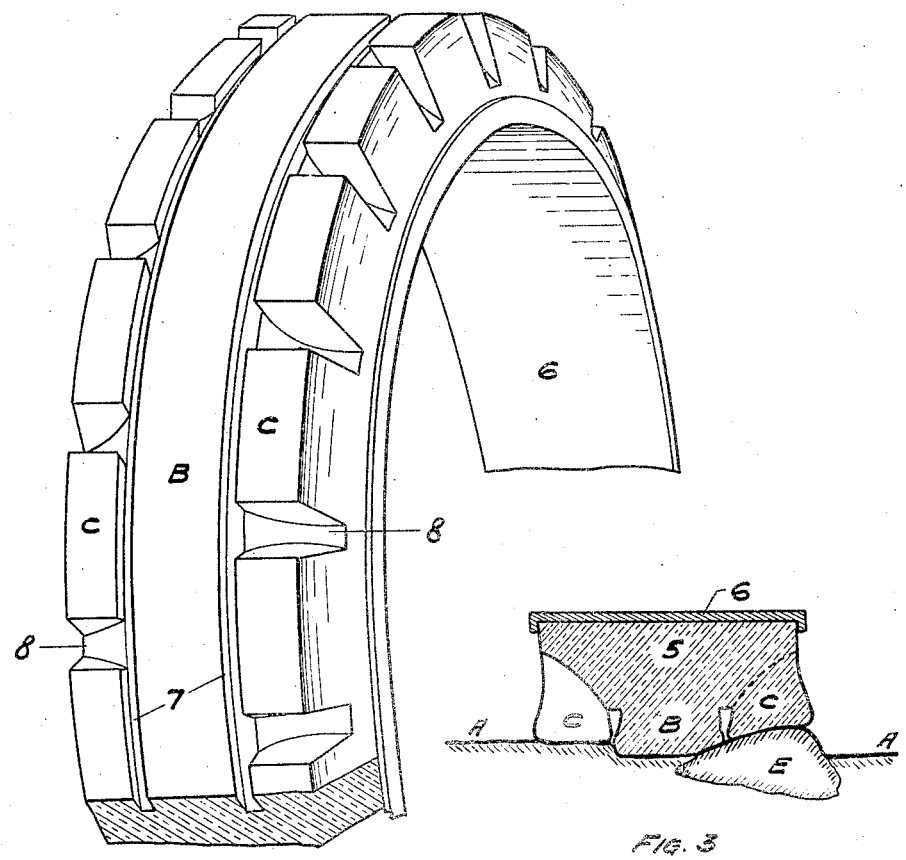
FIG. 1
FIG. 3
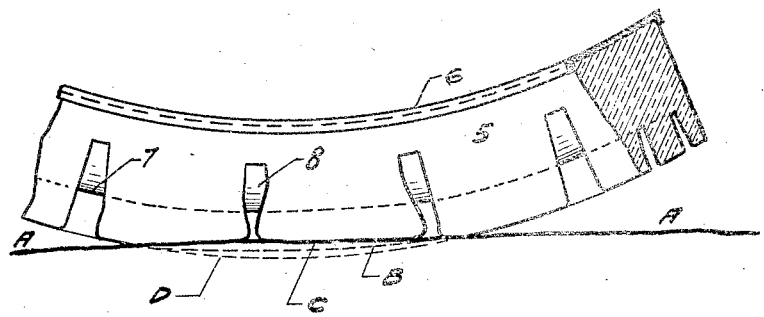
FIG. 2
INVENTOR
Reginald H. Waters.

UNITED STATES PATENT OFFICE.

REGINALD H. WATERS, OF CUMBERLAND, MARYLAND, ASSIGNOR TO KELLY-SPRING-FIELD TIRE COMPANY, OF NEW YORK, N. Y., A CORPORATION OF NEW JERSEY.

VEHICLE TIRE.

1,407,967.      Specification of Letters Patent.      Patented Feb. 28, 1922.

Application filed July 22, 1921. Serial No. 486,663.

*To all whom it may concern:*

Be it known that I, REGINALD H. WATERS, a citizen of the United States, residing at Cumberland, in the county of Allegany and State of Maryland, have invented certain new and useful Improvements in a resilient Vehicle Tire, of which the following is a specification.

This invention relates to improvements in resilient tires of the type known as solids and particularly to the larger sizes used on heavy duty motor trucks wherein the tire is provided with well-defined traction increasing openings.

The principal object of the improvements is to so design the tire structure that the traction increasing features may be retained to best advantage and at the same time provide means whereby the grip on the road will be lost under conditions tending to destroy the tire.

To the attainment of the above object, and others hereinafter appearing, this invention consists in the construction, proportions and novel combinations of parts, fully described, illustrated in the drawing and specifically claimed.

Referring to the drawings:

Figure 1 is a perspective view of a portion of a tire embodying my invention.

Figure 2 is a side elevation of a fragment of the tire under load, showing the performance of the traction portion in relation to the main body of the tread.

Figure 3 is a cross section within the traction zone particularly illustrating the beneficial relief of the traction portion in contact with an obstacle.

In tires of the class having broad flat treads with traction notches and used for heavy duty under severe conditions, it has been found that their chief defect lies in the fact that the very traction imparting virtue is often the direct means of their destruction. That is, a truck is frequently exposed to physical obstacles impossible to overcome, even in the event that the driving wheels attain perfect traction and the full rated power of a speeded-up engine in low gear is applied to them. Under such circumstances the average high-powered engine can deliver more power to the wheels than the tire structure can stand; more especially is this the case where the wheels intermittently spin then abruptly clutch the road as the traction notches find an especially favorable projection to push against. The tire must do one of two things, spin and thus relieve itself of the otherwise destructive stresses, or, clutch-in and be damaged or destroyed as the futile effort of the driver continues. The usual direction taken by such damage is either to completely separate the rubber structure from its anchorage on the metallic rim, a circumstance which, of course, destroys the tire; or, to tear out a traction notch or even the entire piece lying between adjacent notches, a circumstance which seriously impairs the further usefulness of the tire.

The present invention will absolutely and automatically save the structure from consequences resulting from indiscreet power application by refusing to maintain traction beyond the point of useful effort. The traction increasing portions of the structure will "mushroom" both circumferentially and laterally in both directions under dangerous stress until the main load settles on the relatively broader and smooth central band, whereby the wheel will be free to spin and the driver automatically notified that further effort to extricate his vehicle is futile; thus saving the tire.

The function of the invention may be likened to a friction clutch wherein overload on the traction strips beyond a critical stress will cause those members to temporarily collapse, thereby shifting the destructive tendency into the central smooth portion, which converts the stresses into relatively harmless spinning.

The action of the tire will be readily understood by reference to the drawing, wherein numeral 5 represents generally a body portion of the structure mounted upon and securely attached to a rim portion 6. The circumferential channels 7 divide the tire face into three portions; B representing a wide smooth strip bounded by outlying traction strips, C having traction notches 8 of appropriate design impressed therein. The object sought is to so proportion the relative widths of the parts B and C and to further weaken C by traction notches 8 and the abutting channels 7 that the major portion of the weight of the vehicle shall be sustained by B, and especially so when C collapses under the circumstance previously mentioned.

The conditions shown in Fig. 2 may be taken as illustrative of the action of the structure in negotiating a road whose surface is capable of being indented by the tire. The line A—A defines the road surface, D the normal circumference of the tire, B the surface of the smooth strip, showing that the majority of the weight borne thereby tends to impress it into the road a relatively greater degree than is attained by C, the traction strip, which being designed to sustain less load per unit area will become more deformed by the resistance of the road to impress. The flow of the traction strip C, under load is circumferentially into the notches and transversely outwardly and inwardly at the expense of deforming the sides thereof respectively at the outer wall and into the channel 7. The weakening of the strip C is, of course, not so great as to impair the traction-seeking function of the notches 8.

In Fig. 3 is shown, in cross section, a situation wherein one of the traction strips "C" has come into contact with a partially embedded stone "E" assumed to protrude from the road, and become engaged by the leading edge of one of the blocks constituting the strip at approximately the position of an open notch. Assume also that the truck stalls, as on a hill, with this projection in incident with a notch and affording a strong abutment against which the block will react. Power is applied suddenly and the full force concentrated upon the point of the strip C which resists up to its designed rating, then, if traction is not set up in the vehicle, the material releases by temporary collapse permitting the wheel to spin at the expense of the smooth tread B and without incurring injury to the structure.

In seeking the proper proportions for the channels, notches, and related widths of smooth and serrated traction strips it is understood that the class of service for which the tire is intended and the weight to be sustained will govern—the scope of the invention permits a wide variation in these matters.

The drawings have merely illustrated a preferred embodiment of the invention in the form of a unitary structure, capable of being produced by the unit molding operation, but it is apparent that many modifications may be made within the limits of the disclosure and claims. For instance, the traction bands may be entirely separate from the central strip; the notches may take any desired angular direction or assume any form that seems effective. Or, in fact, the channels may be functionally represented by any suitable voids not circumferentially continuous, whereby the necessary relief of the distressed material of the traction elements is secured.

Having thus described my invention and indicated a new and useful departure from the accepted practice of truck tire design, which I claim is:

1. A tire structure formed of solid resilient material comprising a central circumferential strip having a smooth surface and adapted to normally support the greater part of the weight on the tire, and juxtaposed resilient traction increasing strips separated from said smooth strip and having transverse traction openings across their surfaces.

2. A tire structure formed integrally of resilient material comprising a centrally disposed circumferential strip having a smooth surface and adapted to sustain a greater unit compression stress than the traction strips, and juxtaposed counterpart traction strips separated from said smooth strip and having transverse traction serrations across their faces, said traction strips being adapted to deform under load to transfer a greater stress into the smooth strip, for the purpose set forth.

3. A tire structure formed integrally of resilient material having a wide transversely flat surface comprising a smooth weight-sustaining strip isolated from a pair of juxtaposed traction increasing strips, said traction strips having transverse notches whereby their combined weight sustaining capacities in the zone of traction are less than that of the smooth strip and whereby either traction strip is enabled to collapse and lose traction under undue stress at the expense of transmitting its proportion of the load into the smooth strip.

4. A tire structure of resilient material having a transversely flat traction surface of greater width than the radial depth thereof, comprising a circumferentially divided tread including a centrally disposed smooth strip adapted to bear more weight than the counterpart traction strips, and counterpart traction strips weakened to flex under undue tractive stress but to normally attain a greater tractive effort than said smooth strip.

5. A tire structure of resilient material having a substantially transverse flat traction surface, a centrally disposed smooth strip adapted to sustain the maximum weight with the minimum of tractive efficiency, and a plurality of traction increasing strips transversely scored to afford the maximum tractive effort, said scoring adapting them to flex and lose traction in the presence of stresses sufficient to injure the structure, for the purpose set forth.

6. A tire structure of resilient material having a transversely flat tread portion, said tread comprising a centrally disposed smooth strip not less than half the width of said tread, a plurality of traction increasing strips disposed on either side of said smooth strip and separated therefrom by relatively deep circumferential channels, said traction strips being provided with traction increasing openings comprising radially disposed notches intersecting said channels and having their outer termini radially inward of the bases of said channels.

In testimony whereof I affix my signature.

REGINALD H. WATERS.